United States Patent
Ishii et al.

(10) Patent No.: US 11,831,019 B2
(45) Date of Patent: Nov. 28, 2023

(54) BINDER COMPOSITION FOR NON-AQUEOUS SECONDARY BATTERY FUNCTIONAL LAYER, SLURRY COMPOSITION FOR NON-AQUEOUS SECONDARY BATTERY FUNCTIONAL LAYER, NON-AQUEOUS SECONDARY BATTERY MEMBER, AND NON-AQUEOUS SECONDARY BATTERY

(71) Applicant: ZEON CORPORATION, Tokyo (JP)

(72) Inventors: Hidetake Ishii, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 215 days.

(21) Appl. No.: 17/040,980

(22) PCT Filed: Apr. 2, 2019

(86) PCT No.: PCT/JP2019/014672
§ 371 (c)(1),
(2) Date: Sep. 24, 2020

(87) PCT Pub. No.: WO2019/194192
PCT Pub. Date: Oct. 10, 2019

(65) Prior Publication Data
US 2021/0098789 A1    Apr. 1, 2021

(30) Foreign Application Priority Data

Apr. 3, 2018 (JP) ................................ 2018-071839

(51) Int. Cl.
*H01M 4/62* (2006.01)
*C08L 53/02* (2006.01)
*H01M 4/13* (2010.01)
*H01M 10/0525* (2010.01)
*H01M 50/443* (2021.01)

(52) U.S. Cl.
CPC ............ *H01M 4/622* (2013.01); *C08L 53/02* (2013.01); *H01M 4/13* (2013.01); *H01M 10/0525* (2013.01); *H01M 50/443* (2021.01)

(58) Field of Classification Search
None
See application file for complete search history.

(56) References Cited

U.S. PATENT DOCUMENTS

| 4,446,180 A * | 5/1984 | Schwab ................ C09J 153/02 |
| | | 525/98 |
| 2014/0079995 A1 * | 3/2014 | Wakada .............. H01M 4/0435 |
| | | 429/211 |
| 2017/0117533 A1 * | 4/2017 | Takaichi ............. H01M 50/461 |
| 2017/0342235 A1 | 11/2017 | Sakamoto |
| 2019/0044147 A1 | 2/2019 | Yamamoto |

FOREIGN PATENT DOCUMENTS

| EP | 176060 A * | 4/1986 | ............. C08L 25/00 |
| JP | 2001047577 A * | 2/2001 | |
| WO | 2017056404 A1 | 4/2017 | |

OTHER PUBLICATIONS

Oct. 14, 2021, the Extended European Search Report issued by the European Patent Office in the corresponding European Patent Application No. 19780636.7.
Oct. 6, 2020, International Preliminary Report on Patentability issued in the International Patent Application No. PCT/JP2019/014672.

* cited by examiner

*Primary Examiner* — Tanisha Diggs
(74) *Attorney, Agent, or Firm* — KENJA IP LAW PC

(57) ABSTRACT

Provided is a binder composition capable of forming a functional layer that can both inhibit post-cycling swelling of a secondary battery and increase charge carrier acceptance of the secondary battery at low temperatures. The binder composition contains a first polymer, a second polymer, and a solvent. The first polymer is a block copolymer including a block region formed of an aromatic vinyl monomer unit and a block region formed of an aliphatic conjugated diene monomer unit and/or a hydrogenated aliphatic conjugated diene monomer unit. The second polymer is a random copolymer including a 1,3-pentadiene unit and/or a hydrogenated 1,3-pentadiene unit.

12 Claims, No Drawings

BINDER COMPOSITION FOR NON-AQUEOUS SECONDARY BATTERY FUNCTIONAL LAYER, SLURRY COMPOSITION FOR NON-AQUEOUS SECONDARY BATTERY FUNCTIONAL LAYER, NON-AQUEOUS SECONDARY BATTERY MEMBER, AND NON-AQUEOUS SECONDARY BATTERY

TECHNICAL FIELD

The present disclosure relates to a binder composition for a non-aqueous secondary battery functional layer, a slurry composition for a non-aqueous secondary battery functional layer, a non-aqueous secondary battery member, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A secondary battery typically includes non-aqueous secondary battery members (hereinafter, also referred to simply as "battery members") such as electrodes (positive electrode and negative electrode) and a separator that isolates the positive electrode and the negative electrode from each other.

A battery member of a secondary battery may be a member that includes a functional layer for a non-aqueous secondary battery (hereinafter, also referred to simply as a "functional layer") containing a binder and optionally containing particles compounded in order to cause the battery member to display a desired function (hereinafter, referred to as "functional particles").

Specifically, a separator that includes an adhesive layer containing a binder and/or a porous membrane layer containing a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes an adhesive layer and/or a porous membrane layer such as described above on an electrode substrate including an electrode mixed material layer on a current collector may be used as an electrode of a secondary battery.

In recent years, attempts have been made to improve binder compositions used in functional layer formation in order to achieve further improvement of secondary battery performance (for example, refer to Patent Literature (PTL) 1).

PTL 1 describes a binder composition for a non-aqueous secondary battery electrode that contains a particulate polymer A having a volume-average particle diameter of not less than 0.6 μm and not more than 2.5 μm and a particulate polymer B having a volume-average particle diameter of not less than 0.01 μm and not more than 0.5 μm, and in which the proportional content of the particulate polymer A is more than 30 mass % and not more than 90 mass % of the total content of the particulate polymer A and the particulate polymer B. According to PTL 1, peel strength of an electrode can be increased and a secondary battery can be caused to display excellent cycle characteristics by using this binder composition to form an electrode mixed material layer.

CITATION LIST

Patent Literature

PTL 1: WO2017/056404A1

SUMMARY

Technical Problem

In order to enhance battery characteristics (output characteristics, etc.) at low temperatures, it is desirable for electrode active material particles in a secondary battery to accept charge carriers such as lithium ions well under low-temperature conditions (i.e., have excellent charge carrier acceptance at low temperatures). Moreover, secondary batteries suffer from a problem of swelling after repeated charging and discharging (cycling), and there is demand for inhibiting such post-cycling swelling.

Accordingly, one object of the present disclosure is to provide a binder composition for a non-aqueous secondary battery functional layer and a slurry composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Another object of the present disclosure is to provide a non-aqueous secondary battery member including a functional layer that can both inhibit post-cycling swelling of a non-aqueous secondary battery and increase charge carrier acceptance of the non-aqueous secondary battery at low temperatures.

Yet another objective of the present disclosure is to provide a non-aqueous secondary battery in which post-cycling swelling is inhibited and that has excellent charge carrier acceptance at low temperatures.

Solution to Problem

The inventors conducted diligent investigation with the aim of solving the problems set forth above. The inventors discovered that it is possible to form a functional layer that can both inhibit post-cycling swelling of a non-aqueous secondary battery and increase charge carrier acceptance of the non-aqueous secondary battery at low temperatures by using a binder composition that contains a specific block copolymer, a specific random copolymer, and a solvent. In this manner, the inventors completed the present disclosure.

Specifically, the present disclosure aims to advantageously solve the problems set forth above, and a presently disclosed binder composition for a non-aqueous secondary battery functional layer comprises a first polymer, a second polymer, and a solvent, wherein the first polymer is a block copolymer including a block region formed of an aromatic vinyl monomer unit and a block region formed of either or both of an aliphatic conjugated diene monomer unit and a hydrogenated aliphatic conjugated diene monomer unit, and the second polymer is a random copolymer including either or both of a 1,3-pentadiene unit and a hydrogenated 1,3-pentadiene unit. By forming a functional layer using a binder composition containing a solvent, a first polymer that is a block copolymer including a block region formed of an aromatic vinyl monomer unit and a block region formed of an aliphatic conjugated diene monomer unit and/or a hydrogenated aliphatic conjugated diene monomer unit, and a second polymer that is a random copolymer including either or both of a 1,3-pentadiene unit and a hydrogenated 1,3-pentadiene unit in this manner, a battery member that includes the functional layer can both inhibit post-cycling swelling of a secondary battery and increase charge carrier acceptance of the secondary battery at low temperatures.

Note that a "monomer unit" of a polymer referred to in the present disclosure is a "repeating unit derived from the monomer that is included in a polymer obtained using the monomer".

Moreover, a "hydrogenated monomer unit" of a polymer referred to in the present disclosure is a "repeating unit obtained through hydrogenation of a monomer unit derived from the monomer".

Furthermore, when a polymer is said to "include a block region formed of an aromatic vinyl monomer unit" in the present disclosure, this means that "a section where only aromatic vinyl monomer units are bonded to one another in a row as repeating units is present in the polymer".

Also, when a polymer is said to "include a block region formed of either or both of an aliphatic conjugated diene monomer unit and a hydrogenated aliphatic conjugated diene monomer unit" in the present disclosure, this means that "a section where only either or both of aliphatic conjugated diene monomer units and hydrogenated aliphatic conjugated diene monomer units are bonded to one another in a row as repeating units is present in the polymer".

In the presently disclosed binder composition for a non-aqueous secondary battery functional layer, proportional content of the aromatic vinyl monomer unit in the first polymer is preferably not less than 10 mass % and not more than 50 mass %. By using a first polymer for which the proportional content of an aromatic vinyl monomer unit is within the range set forth above, post-cycling swelling of a secondary battery can be further inhibited.

Note that the "proportional content (mass %)" of each repeating unit in a polymer referred to in the present disclosure can be measured by a nuclear magnetic resonance (NMR) method such as $^1$H-NMR.

In the presently disclosed binder composition for a non-aqueous secondary battery functional layer, a total of proportional content of the 1,3-pentadiene unit and proportional content of the hydrogenated 1,3-pentadiene unit in the second polymer is preferably not less than 20 mass % and not more than 70 mass %. By using a second polymer for which the total of the proportional content of a 1,3-pentadiene unit and the proportional content of a hydrogenated 1,3-pentadiene unit is within the range set forth above, post-cycling swelling of a secondary battery can be further inhibited.

In the presently disclosed binder composition for a non-aqueous secondary battery functional layer, the second polymer preferably has a softening point of not lower than 70° C. and not higher than 170° C. By using a second polymer having a softening point within the range set forth above, it is possible to both further inhibit post-cycling swelling of a secondary battery and further increase charge carrier acceptance of the secondary battery at low temperatures.

Note that the "softening point" of a polymer referred to in the present disclosure can be measured in accordance with JIS K 6863.

In the presently disclosed binder composition for a non-aqueous secondary battery functional layer, the second polymer preferably has an acid value of not less than 1 KOH-mg/g and not more than 20 KOH-mg/g. By using a second polymer having an acid value within the range set forth above, stability of a slurry composition produced using the binder composition can be improved.

Note that the "acid value" of a polymer referred to in the present disclosure can be measured in accordance with JIS K 0070.

In the presently disclosed binder composition for a non-aqueous secondary battery functional layer, content of the second polymer is preferably not less than 0.1 mass % and less than 10.0 mass % of total content of the first polymer and the second polymer. By using a binder composition in which the proportion constituted by the content of the second polymer among the total content of the first polymer and the second polymer is within the range set forth above, it is possible to both further inhibit post-cycling swelling of a secondary battery and further increase charge carrier acceptance of the secondary battery at low temperatures.

Moreover, the present disclosure aims to advantageously solve the problems set forth above, and a presently disclosed slurry composition for a non-aqueous secondary battery functional layer comprises any one of the binder compositions for a non-aqueous secondary battery functional layer set forth above. By forming a functional layer using a slurry composition that contains any one of the binder compositions set forth above in this manner, a battery member that includes the functional layer can both inhibit post-cycling swelling of a secondary battery and increase charge carrier acceptance of the secondary battery at low temperatures.

The presently disclosed slurry composition for a non-aqueous secondary battery functional layer can further comprise electrode active material particles. By using the slurry composition for a non-aqueous secondary battery functional layer that contains electrode active material particles as functional particles (i.e., slurry composition for a non-aqueous secondary battery electrode) to form an electrode mixed material layer, an electrode that includes the electrode mixed material layer can both inhibit post-cycling swelling of a secondary battery and increase charge carrier acceptance of the secondary battery at low temperatures.

The presently disclosed slurry composition for a non-aqueous secondary battery functional layer can further comprise non-conductive particles. By using the slurry composition for a non-aqueous secondary battery functional layer that contains non-conductive particles as functional particles (i.e., slurry composition for a non-aqueous secondary battery porous membrane layer) to form a porous membrane layer, a separator or electrode that includes the porous membrane layer can both inhibit post-cycling swelling of a secondary battery and increase charge carrier acceptance of the secondary battery at low temperatures.

Furthermore, the present disclosure aims to advantageously solve the problems set forth above, and a presently disclosed non-aqueous secondary battery member comprises a functional layer for a non-aqueous secondary battery formed using any one of the slurry compositions for a non-aqueous secondary battery functional layer set forth above. Through a battery member that includes a functional layer formed from the slurry composition set forth above, it is possible to both inhibit post-cycling swelling of a secondary battery and increase charge carrier acceptance of the secondary battery at low temperatures.

Also, the present disclosure aims to advantageously solve the problems set forth above, and a presently disclosed non-aqueous secondary battery comprises the non-aqueous secondary battery member set forth above. A secondary battery that includes the battery member set forth above has excellent charge carrier acceptance at low temperatures, and post-cycling swelling thereof is inhibited.

Note that in the present specification, a functional layer that contains a binder and electrode active material particles is referred to as an "electrode mixed material layer", a functional layer that contains a binder and non-conductive particles is referred to as a "porous membrane layer", and a functional layer that contains a binder but does not contain electrode active material particles and non-conductive particles is referred to as an "adhesive layer".

Advantageous Effect

According to the present disclosure, it is possible to provide a binder composition for a non-aqueous secondary battery functional layer and a slurry composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Moreover, according to the present disclosure, it is possible to provide a non-aqueous secondary battery member including a functional layer that can both inhibit post-cycling swelling of a non-aqueous secondary battery and increase charge carrier acceptance of the non-aqueous secondary battery at low temperatures.

Furthermore, according to the present disclosure, it is possible to provide a non-aqueous secondary battery in which post-cycling swelling is inhibited and that has excellent charge carrier acceptance at low temperatures.

DETAILED DESCRIPTION

The following provides a detailed description of embodiments of the present disclosure.

The presently disclosed binder composition for a non-aqueous secondary battery functional layer can be used in production of the presently disclosed slurry composition for a non-aqueous secondary battery functional layer. Moreover, the presently disclosed slurry composition for a non-aqueous secondary battery functional layer can be used in formation of any functional layer (for example, an electrode mixed material layer, a porous membrane layer, or an adhesive layer) having a function such as giving and receiving electrons, reinforcement, or adhesion inside a non-aqueous secondary battery. Furthermore, the presently disclosed non-aqueous secondary battery member includes a functional layer formed from the presently disclosed slurry composition for a non-aqueous secondary battery functional layer. Also, the presently disclosed non-aqueous secondary battery includes the presently disclosed non-aqueous secondary battery member.

(Binder Composition for Non-Aqueous Secondary Battery Functional Layer)

The presently disclosed binder composition contains a first polymer, a second polymer, and a solvent, and optionally further contains other components that can be compounded in a functional layer of a secondary battery.

Features of the Presently Disclosed Binder Composition are:

the first polymer is a block copolymer including a block region formed of an aromatic vinyl monomer unit (hereinafter, also referred to simply as an "aromatic vinyl block region") and a block region formed of either or both of an aliphatic conjugated diene monomer unit and a hydrogenated aliphatic conjugated diene monomer unit (hereinafter, also referred to simply as a "(hydrogenated) aliphatic conjugated diene block region"); and the second polymer is a random copolymer including either or both of a 1,3-pentadiene unit and a hydrogenated 1,3-pentadiene unit.

As a result of the presently disclosed binder composition containing the first polymer and the second polymer set forth above in a solvent, a battery member that can inhibit post-cycling swelling of a secondary battery while also improving charge carrier acceptance of the secondary battery at low temperatures can be obtained by forming a functional layer using a slurry composition that contains the binder composition. Although it is not clear why inhibition of post-cycling swelling of a secondary battery and improvement of charge carrier acceptance of the secondary battery at low temperatures can be achieved by forming a functional layer of a battery member using the binder composition containing the specific first polymer and the specific second polymer in a solvent in this manner, the reasons for this are presumed to be as follows.

Firstly, the aromatic vinyl block region included in the first polymer adopts a pseudo cross-linked structure in a functional layer as a result of such regions being attracted to one another, and thus the aromatic vinyl block region enables strong adhesion of battery members via the functional layer and contributes to inhibition of swelling of a secondary battery after cycling. On the other hand, the (hydrogenated) aliphatic conjugated diene block region included in the first polymer is composed of only an aliphatic conjugated diene monomer unit and/or a hydrogenated aliphatic conjugated diene monomer unit having excellent binding capacity, and thus imparts adhesiveness to a functional layer and contributes to inhibiting swelling of a secondary battery after cycling in the same way as the aromatic vinyl block region described above, while, on the other hand, also having excellent flexibility. As a result of the first polymer including a region having excellent flexibility in this manner, the shape of the first polymer can readily track an adhesion target that is adjacent thereto and the first polymer can display good properties as a binder. However, as a result of the first polymer that serves as a binder having flexibility, the first polymer may be excessively squashed during pressing of a functional layer (for example, pressing of an electrode with the aim of densifying an electrode mixed material layer or compression of a cell with the aim of improving secondary battery energy density). Excessive squashing of the first polymer may cause the first polymer to cover the surfaces of electrode active material particles to a greater degree than is necessary and may block paths for migration of charge carriers inside the functional layer, for example, leading to reduction of charge carrier acceptance at low temperatures.

However, the presently disclosed binder composition contains the second polymer that is a random copolymer including either or both of a 1,3-pentadiene unit and a hydrogenated 1,3-pentadiene unit in addition to the first polymer described above. The 1,3-pentadiene unit and the hydrogenated 1,3-pentadiene unit included in the second polymer can impart heat deterioration resistance to the second polymer, and thus the second polymer has a comparatively low tendency to deform even during pressing of a functional layer. Consequently, by forming a functional layer using a binder composition that contains not only the first polymer, but also the second polymer, the second polymer having the properties described above can contribute to inhibiting excessive squashing of the first polymer even in a situation in which the functional layer is pressed.

For these reasons, the presently disclosed binder composition containing the first polymer and the second polymer is thought to inhibit post-cycling swelling of a secondary battery by enabling strong adhesion of battery members via a functional layer while also sufficiently ensuring charge carrier acceptance of the secondary battery at low temperatures by inhibiting excessive squashing of the first polymer.

<First Polymer>

The first polymer is a block copolymer including an aromatic vinyl block region and a (hydrogenated) aliphatic conjugated diene block region. The first polymer may optionally include a macromolecule chain section where repeating units other than an aromatic vinyl monomer unit, an aliphatic conjugated diene monomer unit, and a hydrogenated aliphatic conjugated diene monomer unit are linked (hereinafter, also referred to simply as the "other region").

Note that the first polymer may include just one aromatic vinyl block region or a plurality of aromatic vinyl block regions, may include just one (hydrogenated) aliphatic conjugated diene block region or a plurality of (hydrogenated) aliphatic conjugated diene block regions, and may include just one other region or a plurality of other regions.

<<Aromatic Vinyl Block Region>>

The aromatic vinyl block region is a region that only includes an aromatic vinyl monomer unit as a repeating unit.

A single aromatic vinyl block region may be formed of just one type of aromatic vinyl monomer unit or may be formed of a plurality of types of aromatic vinyl monomer units, but is preferably formed of just one type of aromatic vinyl monomer unit.

Moreover, a single aromatic vinyl block region may include a coupling moiety (i.e., aromatic vinyl monomer units forming a single aromatic vinyl block region may be linked to one another with a coupling moiety interposed therebetween).

In a case in which the first polymer includes a plurality of aromatic vinyl block regions, the types and proportions of aromatic vinyl monomer units forming these aromatic vinyl block regions may be the same or different for each of the aromatic vinyl block regions, but are preferably the same.

Examples of aromatic vinyl monomers that can form an aromatic vinyl monomer unit of the aromatic vinyl block region in the first polymer include styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually.

Note that in the present disclosure, a compound corresponding to an "aromatic vinyl monomer" is considered to not correspond to an "acidic group-containing monomer" described further below.

The proportion constituted by an aromatic vinyl monomer unit in the first polymer when the amount of all repeating units in the first polymer (inclusive of monomer units and hydrogenated monomer units, and also inclusive of repeating units of a graft portion in a case in which the polymer includes a graft portion; same applies below) is taken to be 100 mass % is preferably 10 mass % or more, more preferably 12 mass % or more, even more preferably 14 mass % or more, and particularly preferably 15 mass % or more, and is preferably 50 mass % or less, more preferably 40 mass % or less, even more preferably 35 mass % or less, and particularly preferably 32 mass % or less. When the proportion constituted by an aromatic vinyl monomer unit in the first polymer is 10 mass % or more, battery members can be more strongly adhered via a functional layer, and post-cycling swelling of a secondary battery can be further inhibited. On the other hand, when the proportion constituted by an aromatic vinyl monomer unit in the first polymer is 50 mass % or less, the first polymer is not excessively rigid and, in a situation in which pressing of a functional layer is performed, the shape of the first polymer can track an adhesion target adjacent thereto to an extent that enables sufficient expression of a function as a binder. Consequently, battery members can be more strongly adhered via the functional layer, and post-cycling swelling of a secondary battery can be further inhibited.

Note that the proportion constituted by an aromatic vinyl monomer unit in the first polymer is normally the same as the proportion constituted by the aromatic vinyl block region in the first polymer.

<<(Hydrogenated) Aliphatic Conjugated Diene Block Region>>

The (hydrogenated) aliphatic conjugated diene block region is a region that only includes an aliphatic conjugated diene monomer unit as a repeating unit, that only includes a hydrogenated aliphatic conjugated diene monomer unit as a repeating unit, or that only includes an aliphatic conjugated diene monomer unit and a hydrogenated aliphatic conjugated diene monomer unit as repeating units. (Hereinafter, "(hydrogenated) aliphatic conjugated diene monomer unit" may be used as a collective term for both an "aliphatic conjugated diene monomer unit" and a "hydrogenated aliphatic conjugated diene monomer unit".)

A single (hydrogenated) aliphatic conjugated diene block region may be formed of just one type of (hydrogenated) aliphatic conjugated diene monomer unit or may be formed of a plurality of types of (hydrogenated) aliphatic conjugated diene monomer units, but is preferably formed of just one type of (hydrogenated) aliphatic conjugated diene monomer unit.

Moreover, a single (hydrogenated) aliphatic conjugated diene block region may include a coupling moiety (i.e., (hydrogenated) aliphatic conjugated diene monomer units forming a single (hydrogenated) aliphatic conjugated diene block region may be linked to one another with a coupling moiety interposed therebetween).

In a case in which the first polymer includes a plurality of (hydrogenated) aliphatic conjugated diene block regions, the types and proportions of (hydrogenated) aliphatic conjugated diene monomer units forming these (hydrogenated) aliphatic conjugated diene block regions may be the same or different for each of the (hydrogenated) aliphatic conjugated diene block regions, but are preferably the same.

Examples of aliphatic conjugated diene monomers that can form a (hydrogenated) aliphatic conjugated diene monomer unit of the (hydrogenated) aliphatic conjugated diene block region in the first polymer include conjugated diene compounds having a carbon number of 4 or more such as 1,3-butadiene, isoprene, 2,3-dimethyl-1,3-butadiene, and 1,3-pentadiene. Of these aliphatic conjugated diene monomers, 1,3-butadiene and isoprene are preferable. Although one of these aliphatic conjugated diene monomers may be used individually or two or more of these aliphatic conjugated diene monomers may be used in combination, it is preferable that one of these aliphatic conjugated diene monomers is used individually.

The proportion constituted by a (hydrogenated) aliphatic conjugated diene monomer unit in the first polymer when the amount of all repeating units in the first polymer is taken to be 100 mass % is preferably 50 mass % or more, more preferably 60 mass % or more, even more preferably 65 mass % or more, and particularly preferably 68 mass % or more, and is preferably 90 mass % or less, more preferably 88 mass % or less, even more preferably 86 mass % or less, and particularly preferably 85 mass % or less. When the proportion constituted by a (hydrogenated) aliphatic conjugated diene monomer unit in the first polymer is 50 mass % or more, flexibility of the first polymer is ensured and, in a situation in which pressing of a functional layer is performed, the shape of the first polymer can track an adhesion target adjacent thereto to an extent that enables sufficient expression of a function as a binder. Consequently, battery members can be more strongly adhered via the functional layer, and post-cycling swelling of a secondary battery can be further inhibited. On the other hand, when the proportion constituted by a (hydrogenated) aliphatic conjugated diene monomer unit in the first polymer is 90 mass % or less, battery members can be more strongly adhered via a functional layer, and post-cycling swelling of a secondary battery can be further inhibited.

Note that the proportion constituted by a (hydrogenated) aliphatic conjugated diene monomer unit in the first polymer is normally the same as the proportion constituted by the (hydrogenated) aliphatic conjugated diene block region in the first polymer.

<<Other Region>>

The other region is a region that is formed of a repeating unit other than an aromatic vinyl monomer unit, an aliphatic conjugated diene monomer unit, and a hydrogenated aliphatic conjugated diene monomer unit (hereinafter, also referred to simply as the "other repeating unit") as a repeating unit.

A single other region may be formed of one type of other repeating unit or may be formed of a plurality of types of other repeating units.

Moreover, a single other region may include a coupling moiety (i.e., other repeating units forming a single other region may be linked to one another with a coupling moiety interposed therebetween).

In a case in which the first polymer includes a plurality of other regions, the types and proportions of other repeating units forming these other regions may be the same or different for each of the other regions.

[[Acidic Group-Containing Monomer Unit]]

The other repeating unit forming the other region of the first polymer is not specifically limited and may, for example, be an acidic group-containing monomer unit.

Examples of acidic group-containing monomers that can form an acidic group-containing monomer unit include carboxyl group-containing monomers, sulfo group-containing monomers, and phosphate group-containing monomers.

Examples of carboxyl group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group through hydrolysis can also be used as a carboxyl group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One acidic group-containing monomer may be used to form an acidic group-containing monomer unit or two or more acidic group-containing monomers may be used in combination to form acidic group-containing monomer units. Of these acidic group-containing monomers, methacrylic acid, itaconic acid, and acrylic acid are more preferable, and methacrylic acid is even more preferable.

[Graft Portion]

The first polymer may include a graft portion as the other region set forth above. In other words, the first polymer may have a structure in which a polymer forming a graft portion is bonded to a polymer forming a backbone portion.

An acidic group-containing monomer unit such as described above is preferable as a repeating unit included in a graft portion of the first polymer. An acidic group-containing monomer used to form the acidic group-containing monomer unit included in the graft portion of the first polymer may be one acidic group-containing monomer used individually or two or more acidic group-containing monomers used in combination. Of acidic group-containing monomers, methacrylic acid, itaconic acid, and acrylic acid are more preferable, and methacrylic acid is even more preferable.

In a case in which the first polymer includes a graft portion, the proportion constituted by the graft portion in the first polymer when the amount of all repeating units in the first polymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less.

<<Production Method of First Polymer>>

No specific limitations are placed on the method by which the first polymer that is a specific block copolymer is produced. The first polymer can be produced by, for example, polymerizing a first monomer component in the presence of an organic solvent to obtain a solution, adding a second monomer component, differing from the first monomer component, to the solution and polymerizing the second monomer component, and further repeating addition and polymerization of monomer components (block copolymerization) as necessary. The organic solvent used as a reaction solvent is not specifically limited and can be selected as appropriate depending on the types of monomers and so forth.

After performing block copolymerization as described above, it is preferable that the obtained polymer is subjected to a coupling reaction using a coupling agent. The coupling reaction can, for example, cause the terminals of diblock structures contained in the block copolymer to bond to each other through the coupling agent to thereby convert the diblock structures to a triblock structure.

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable. Note that through the coupling reaction using a coupling agent, a coupling moiety derived from the coupling agent is introduced into a macromolecule chain (for example, a triblock structure) of the block copolymer.

After the block copolymerization described above, hydrogenation and/or graft polymerization may be performed as necessary. In a case in which the previously described coupling reaction is performed after block copolymerization, hydrogenation and/or graft polymerization may be performed before the coupling reaction or may be performed after the coupling reaction.

The hydrogenation makes it possible to convert at least some aliphatic conjugated diene monomer units to hydrogenated aliphatic conjugated diene monomer units and thereby obtain a first polymer that includes a hydrogenated aliphatic conjugated diene monomer unit in the (hydrogenated) aliphatic conjugated diene block region. Selective hydrogenation of an aliphatic conjugated diene monomer unit can be carried out by a commonly known method such as an oil-layer hydrogenation method or a water-layer hydrogenation method.

Moreover, by performing graft polymerization, it is possible to obtain a first polymer that includes a graft portion such as previously described as the other region. No specific limitations are placed on the method of graft polymerization. For example, a polymer including an aromatic vinyl block region and a (hydrogenated) aliphatic conjugated diene block region that includes an aliphatic conjugated diene monomer unit may be produced, and then graft polymerization of an acidic group-containing monomer such as previously described, or the like, may be performed by a known method with respect to the polymer as a backbone portion to obtain a block copolymer having a structure in which a polymer of a graft portion is bonded to an aliphatic conjugated diene monomer unit of the polymer of the backbone portion.

<<Weight-Average Molecular Weight>>

The weight-average molecular weight of the first polymer that can be produced as set forth above is preferably 50,000 or more, more preferably 60,000 or more, and even more preferably 70,000 or more, and is preferably 1,000,000 or less, more preferably 900,000 or less, and even more preferably 850,000 or less. When the weight-average molecular weight of the first polymer is 50,000 or more, polymer strength is ensured, and squashing of the first polymer can be inhibited during pressing of a functional layer. Consequently, charge carrier acceptance of a secondary battery at low temperatures can be further improved. On the other hand, when the weight-average molecular weight of the first polymer is 1,000,000 or less, flexibility of the first polymer is ensured and, in a situation in which pressing of a functional layer is performed, the shape of the first polymer can track an adhesion target adjacent thereto to an extent that enables sufficient expression of a function as a binder. Consequently, battery members can be more strongly adhered via the functional layer, and post-cycling swelling of a secondary battery can be further inhibited.

The "weight-average molecular weight" of the first polymer referred to in the present disclosure can be measured by a method described in the EXAMPLES section of the present specification.

<<Coupling Ratio>>

The coupling ratio of the first polymer is preferably 60 mass % or more, more preferably 65 mass % or more, and even more preferably 70 mass % or more, and is preferably 92 mass % or less, more preferably 90 mass % or less, and even more preferably 88 mass % or less. When the coupling ratio of the first polymer is 60 mass % or more, polymer strength is ensured, and squashing of the first polymer can be inhibited during pressing of a functional layer. Consequently, charge carrier acceptance of a secondary battery at low temperatures can be further improved. On the other hand, when the coupling ratio of the first polymer is 92 mass % or less, flexibility of the first polymer is ensured and, in a situation in which pressing of a functional layer is performed, the shape of the first polymer can track an adhesion target adjacent thereto to an extent that enables sufficient expression of a function as a binder. Consequently, battery members can be more strongly adhered via the functional layer, and post-cycling swelling of a secondary battery can be further inhibited.

Note that the "coupling ratio" referred to in the present disclosure is the proportion (mass %) constituted by coupling moiety-containing structures among all structures (diblock structures, triblock structures, etc.) of a polymer obtained through a coupling reaction. The "coupling ratio" of the first polymer can be measured by a method described in the EXAMPLES section of the present specification.

Moreover, the coupling ratio can be adjusted by altering the amount of the coupling agent that is used in the coupling reaction, for example.

<Second Polymer>

The second polymer is a random copolymer that includes either or both of a 1,3-pentadiene unit and a hydrogenated 1,3-pentadiene unit (hereinafter, "(hydrogenated) 1,3-pentadiene unit" may be used as a collective term for both a "1,3-pentadiene unit" and a "hydrogenated 1,3-pentadiene unit"), and that also includes a repeating unit other than a (hydrogenated) 1,3-pentadiene unit (hereinafter, referred to as the "other repeating unit"). Note that in the second polymer that is a random copolymer, (hydrogenated) 1,3-pentadiene units (repeating units derived from 1,3-pentadiene) and other repeating units (repeating units derived from a monomer other than 1,3-pentadiene) are randomly linked. Moreover, (hydrogenated) 1,3-pentadiene units may have a uniform distribution or a tapered distribution in the polymer.

<<(Hydrogenated) 1,3-Pentadiene Unit>>

The second polymer is required to include a (hydrogenated) 1,3-pentadiene unit as previously described. The proportion constituted by a (hydrogenated) 1,3-pentadiene unit in the second polymer when all repeating units in the second polymer are taken to be 100 mass % is preferably 20 mass % or more, more preferably 30 mass % or more, even more preferably 35 mass % or more, and particularly preferably 41 mass % or more, and is preferably 70 mass % or less, more preferably 65 mass % or less, even more preferably 60 mass % or less, and particularly preferably 59 mass % or less. When the proportion constituted by a (hydrogenated) 1,3-pentadiene unit (i.e., the total of the proportional content of a 1,3-pentadiene unit and the proportional content of a hydrogenated 1,3-pentadiene unit) in the second polymer is 20 mass % or more, battery members can be more strongly adhered via a functional layer, and post-cycling swelling of a secondary battery can be further inhibited. In addition, heat deterioration resistance of the second polymer improves, and deformation of the second polymer during pressing of a functional layer can be further inhibited. Therefore, as a result, excessive squashing of the first polymer can be sufficiently inhibited, and charge carrier acceptance of a secondary battery at low temperatures can be further improved. On the other hand, when the proportion constituted by a (hydrogenated) 1,3-pentadiene unit in the second polymer is 70 mass % or less, battery members can be more strongly adhered via a functional layer, and post-cycling swelling of a secondary battery can be further inhibited.

Note that 1,3-pentadiene used to form a (hydrogenated) 1,3-pentadiene unit may be either cis-1,3-pentadiene or trans-1,3-pentadiene, or may be a mixture thereof. From a viewpoint of raising the softening point of the second polymer and further improving charge carrier acceptance of a secondary battery at low temperatures, the 1,3-pentadiene is preferably trans-1,3-pentadiene used individually or a mixture of cis-1,3-pentadiene and trans-1,3-pentadiene.

<<Other Repeating Units>>

Examples of other repeating units include, but are not specifically limited to, an alicyclic monoolefin monomer unit having a carbon number of not less than 4 and not more than 6, an acyclic monoolefin monomer unit having a carbon number of not less than 4 and not more than 8, an aromatic monoolefin monomer unit, an alicyclic diolefin monomer unit, a hydrogenated alicyclic diolefin monomer unit (hereinafter, "(hydrogenated) alicyclic diolefin monomer unit" may be used as a collective term for both an "alicyclic diolefin monomer unit" and a "hydrogenated alicyclic diolefin monomer unit"), and a carboxyl group-containing monomer unit.

[Alicyclic Monoolefin Monomer Unit Having Carbon Number of not Less than 4 and not More than 6]

An alicyclic monoolefin monomer having a carbon number of not less than 4 and not more than 6 that can form an alicyclic monoolefin monomer unit having a carbon number of not less than 4 and not more than 6 is a hydrocarbon compound that has a carbon number of not less than 4 and not more than 6 and that includes one ethylenically unsaturated bond and a non-aromatic ring structure in a molecular structure thereof.

Specific examples of alicyclic monoolefin monomers having a carbon number of not less than 4 and not more than 6 include cyclobutene, cyclopentene, cyclohexene, methylcyclobutene, and methylcyclopentene. One of these alicyclic monoolefin monomers may be used individually, or two or more of these alicyclic monoolefin monomers may be used in combination.

The proportion constituted by an alicyclic monoolefin monomer unit having a carbon number of not less than 4 and not more than 6 in the second polymer when the amount of all repeating units in the second polymer is taken to be 100 mass % is preferably 10 mass % or more, more preferably 15 mass % or more, and even more preferably 20 mass % or more, and is preferably 35 mass % or less, more preferably 30 mass % or less, and even more preferably 27.5 mass % or less.

[Acyclic Monoolefin Monomer Unit Having Carbon Number of not Less than 4 and not More than 8]

An acyclic monoolefin monomer having a carbon number of not less than 4 and not more than 8 that can form an acyclic monoolefin monomer unit having a carbon number of not less than 4 and not more than 8 is a chain hydrocarbon compound that has a carbon number of not less than 4 and not more than 8, and that includes one ethylenically unsaturated bond and does not include a ring structure in a molecular structure thereof.

Specific examples of acyclic monoolefin monomers having a carbon number of not less than 4 and not more than 8 include 1-butene, 2-butene, isobutylene (2-methylpropene), 1-pentene, 2-pentene, 2-methyl-1-butene, 3-methyl-1-butene, 2-methyl-2-butene, 1-hexene, 2-hexene, 2-methyl-1-pentene, 1-heptene, 2-heptene, 2-methyl-1-hexene, 1-octene, 2-octene, 2-methyl-1-heptene, and diisobutylene (2,4,4-trimethyl-1-pentene and 2,4,4-trimethyl-1-pentene). One of these acyclic monoolefin monomers may be used individually, or two or more of these acyclic monoolefin monomers may be used in combination.

The proportion constituted by an acyclic monoolefin monomer unit having a carbon number of not less than 4 and not more than 8 in the second polymer when the amount of all repeating units in the second polymer is taken to be 100 mass % is preferably 5 mass % or more, and is preferably 30 mass % or less, more preferably 25 mass % or less, and even more preferably 20 mass % or less.

[Aromatic Monoolefin Monomer Unit]

An aromatic monoolefin monomer that can form an aromatic monoolefin monomer unit is an aromatic compound including one ethylenically unsaturated bond in a molecular structure thereof.

Specific examples of aromatic monoolefin monomers include styrene, α-methylstyrene, vinyltoluene, indene, and coumarone. One of these aromatic monoolefin monomers may be used individually, or two or more of these aromatic monoolefin monomers may be used in combination.

The proportion constituted by an aromatic monoolefin monomer unit in the second polymer when the amount of all repeating units in the second polymer is taken to be 100 mass % is preferably 10 mass % or more, more preferably 12 mass % or more, and even more preferably 13 mass % or more, and is preferably 40 mass % or less, more preferably 30 mass % or less, and even more preferably 25 mass % or less.

[(Hydrogenated) Alicyclic Diolefin Monomer Unit]

An alicyclic diolefin monomer that can form a (hydrogenated) alicyclic diolefin monomer unit is a hydrocarbon compound including at least two ethylenically unsaturated bonds and a non-aromatic ring structure in a molecular structure thereof.

Specific examples of alicyclic diolefin monomers include cyclopentadiene, a multimer of cyclopentadiene such as dicyclopentadiene, methylcyclopentadiene, and a multimer of methylcyclopentadiene. One of these alicyclic diolefin monomers may be used individually, or two or more of these alicyclic diolefin monomers may be used in combination.

The proportion constituted by a (hydrogenated) alicyclic diolefin monomer unit in the second polymer when the amount of all repeating units in the second polymer is taken to be 100 mass % is 0 mass % or more, and is preferably 1 mass % or less, more preferably 0.8 mass % or less, and even more preferably 0.5 mass % or less.

[Carboxyl Group-Containing Monomer Unit]

Specific examples of carboxyl group-containing monomers that can form a carboxyl group-containing monomer unit include the examples given as "carboxyl group-containing monomers" in the "First polymer" section, and also Diels-Alder adducts of a conjugated diene and an α,β-unsaturated dicarboxylic acid having a carbon number of 8 or less, such as 3,6-endomethylene-1,2,3,6-tetrahydrophthalic acid. One of these carboxyl group-containing monomers may be used individually, or two or more of these carboxyl group-containing monomers may be used in combination.

The proportion constituted by a carboxyl group-containing monomer unit in the second polymer when the amount of all repeating units in the second polymer is taken to be 100 mass % is preferably 0.5 mass % or more, more preferably 1 mass % or more, and even more preferably 1.5 mass % or more, and is preferably 7 mass % or less, more preferably 6 mass % or less, and even more preferably 5 mass % or less.

<<Production Method of Second Polymer>>

No specific limitations are placed on the method by which the second polymer is produced. The second polymer can be produced by performing random polymerization of a monomer composition containing the monomers described above in an organic solvent, for example, and then optionally performing hydrogenation. The proportional content of each monomer in the monomer composition can be set in accordance with the proportional content of each monomer unit (and hydrogenated unit) in the second polymer. Note that the method of polymerization, the polymerization reaction, and the method of hydrogenation can be known methods. Moreover, the organic solvent used as a reaction solvent is not specifically limited and can be selected as appropriate depending on the types of monomers and so forth.

More specifically, the second polymer is preferably produced by performing random polymerization of a monomer composition containing 1,3-pentadiene in an organic solvent and subsequently adding a carboxyl group-containing monomer to perform acid modification.

<<Softening Point>>

The softening point of the second polymer that can be produced as set forth above is preferably 70° C. or higher, more preferably 80° C. or higher, even more preferably 85° C. or higher, and particularly preferably 95° C. or higher, and is preferably 170° C. or lower, more preferably 150° C. or lower, and even more preferably 130° C. or lower. When the softening point of the second polymer is 70° C. or higher, deformation of the second polymer during pressing of a functional layer can be further inhibited. Therefore, as a result, excessive squashing of the first polymer can be sufficiently inhibited, and charge carrier acceptance of a secondary battery at low temperatures can be further improved. On the other hand, when the softening point of the second polymer is 170° C. or lower, battery members can be more strongly adhered via a functional layer, and post-cycling swelling of a secondary battery can be further inhibited.

<<Acid Value>>

The acid value of the second polymer is preferably 1 KOH-mg/g or more, more preferably 3 KOH-mg/g or more, even more preferably 4 KOH-mg/g or more, and particularly preferably 10 KOH-mg/g or more, and is preferably 20 KOH-mg/g or less, more preferably 18 KOH-mg/g or less, and even more preferably 17 KOH-mg/g or less. When the acid value of the second polymer is within any of the ranges set forth above, stability of a slurry composition produced using the binder composition can be improved.

<<Number-Average Molecular Weight>>

The number-average molecular weight of the second polymer is preferably 300 or more, more preferably 500 or more, and even more preferably 700 or more, and is preferably 2,500 or less, more preferably 2,300 or less, and even more preferably 2,200 or less. When the number-average molecular weight of the second polymer is within any of the ranges set forth above, compatibility of the first polymer and the second polymer improves, and battery members can be more strongly adhered via a functional layer. Consequently, post-cycling swelling of a secondary battery can be further inhibited.

Note that the number-average molecular weight of the second polymer can be measured by a method described in the EXAMPLES section of the present specification.

<<Weight-Average Molecular Weight>>

The weight-average molecular weight of the second polymer is preferably 500 or more, more preferably 1,000 or more, and even more preferably 2,000 or more, and is preferably 5,500 or less, more preferably 5,000 or less, and even more preferably 4,800 or less. When the weight-average molecular weight of the second polymer is within any of the ranges set forth above, compatibility of the first polymer and the second polymer improves, and battery members can be more strongly adhered via a functional layer. Consequently, post-cycling swelling of a secondary battery can be further inhibited.

Note that the weight-average molecular weight of the second polymer can be measured by a method described in the EXAMPLES section of the present specification.

<<Z-Average Molecular Weight>>

The Z-average molecular weight of the second polymer is preferably 1,000 or more, more preferably 2,000 or more, and even more preferably 3,000 or more, and is preferably 12,000 or less, more preferably 11,000 or less, and even more preferably 10,000 or less. When the Z-average molecular weight of the second polymer is within any of the ranges set forth above, compatibility of the first polymer and the second polymer improves, and battery members can be more strongly adhered via a functional layer. Consequently, post-cycling swelling of a secondary battery can be further inhibited.

Note that the Z-average molecular weight of the second polymer can be measured by a method described in the EXAMPLES section of the present specification.

<<Ratio of Weight-Average Molecular Weight Relative to Number-Average Molecular Weight>>

The ratio (Mw/Mn) of the weight-average molecular weight relative to the number-average molecular weight of the second polymer is preferably 1.0 or more, more preferably 1.2 or more, and even more preferably 1.4 or more, and is preferably 4.0 or less, more preferably 3.5 or less, and even more preferably 3.0 or less. When Mw/Mn of the second polymer is within any of the ranges set forth above, compatibility of the first polymer and the second polymer improves, and battery members can be more strongly adhered via a functional layer. Consequently, post-cycling swelling of a secondary battery can be further inhibited.

<<Ratio of Z-Average Molecular Weight Relative to Weight-Average Molecular Weight>>

The ratio (Mz/Mw) of the Z-average molecular weight relative to the weight-average molecular weight of the second polymer is preferably 1.0 or more, and is preferably 4.0 or less, more preferably 3.5 or less, and even more preferably 3.3 or less. When Mz/Mw of the second polymer is within any of the ranges set forth above, compatibility of the first polymer and the second polymer improves, and battery members can be more strongly adhered via a functional layer. Consequently, post-cycling swelling of a secondary battery can be further inhibited.

<Content Ratio of First Polymer and Second Polymer>

No specific limitations are placed on the content ratio (in terms of solid content) of the first polymer and the second polymer in the presently disclosed binder composition. The content of the second polymer in the presently disclosed binder composition, for example, is preferably 0.1 mass % or more, more preferably 0.3 mass % or more, even more preferably 0.5 mass % or more, and particularly preferably 5.0 mass % or more of the total content of the first polymer and the second polymer, and is preferably less than 10.0 mass %, more preferably 9.0 mass % or less, and even more preferably 8.0 mass % or less of the total content of the first polymer and the second polymer. When the content of the second polymer constitutes 0.1 mass % or more among the total content of the first polymer and the second polymer, charge carrier acceptance of a secondary battery at low temperatures can be further improved. On the other hand, when the content of the second polymer constitutes less than 10.0 mass % among the total content of the first polymer and the second polymer, battery members can be more strongly adhered via a functional layer, and post-cycling swelling of a secondary battery can be further inhibited.

<Solvent>

The solvent contained in the presently disclosed binder composition is not specifically limited, but preferably includes water. Moreover, the presently disclosed binder composition may contain, as the solvent, an organic solvent that was used as a reaction solvent in production of the first polymer or the second polymer.

<Other Components>

The presently disclosed binder composition can contain components other than the components described above (i.e., other components). The binder composition may contain a polymer component that does not correspond to the first polymer and the second polymer set forth above. For example, the binder composition may contain a known particulate binder such as a styrene-butadiene random copolymer or an acrylic polymer. Moreover, the binder composition main contain known additives. Examples of such additives include antioxidants, defoamers, and dispersants. Note that one other component may be used individually, or two or more other components may be used in combination in a freely selected ratio.

<Production Method of Binder Composition>

The presently disclosed binder composition can be produced by mixing the components described above without any specific limitations. For example, in a case in which a binder composition containing water as a solvent is to be produced, a polymer (first polymer or second polymer) obtained as a solution containing an organic solvent is preferably subjected to an emulsification step.

The method of emulsification in the emulsification step is not specifically limited, but is preferably a method of performing phase-inversion emulsification of a preliminary mixture of a solution that contains the polymer and the organic solvent (polymer solution) and an aqueous solution of an emulsifier, for example. The phase-inversion emulsification can be carried out using a known emulsifier and a known emulsifying and dispersing device, for example.

A water dispersion of the polymer can then be obtained by using a known method to remove the organic solvent from the emulsion obtained after phase-inversion emulsification as necessary.

Note that emulsification may be performed simultaneously for both the first polymer and the second polymer, or may be performed individually for each of the first polymer and the second polymer. In other words, the emulsification described above may be performed using a polymer solution that contains both the first polymer and the second polymer, or the emulsification may be performed with respect to each of a polymer solution containing the first polymer and a polymer solution containing the second polymer, and then an obtained water dispersion of the first polymer and an obtained water dispersion of the second polymer may be mixed.

(Slurry Composition for Non-Aqueous Secondary Battery Functional Layer)

The presently disclosed slurry composition is a composition that is for use in formation of a functional layer, that contains the binder composition set forth above, and that optionally further contains functional particles. In other words, the presently disclosed slurry composition contains the previously described first polymer, second polymer, and solvent, and optionally further contains functional particles and other components. As a result of the presently disclosed slurry composition containing the binder composition set forth above, a battery member that includes a functional layer formed from the slurry composition can both inhibit post-cycling swelling of a secondary battery and increase charge carrier acceptance of the secondary battery at low temperatures.

<Binder Composition>

The presently disclosed binder composition set forth above, which contains the specific first polymer and the specific second polymer in a solvent, is used as the binder composition.

No specific limitations are placed on the amount of the binder composition in the slurry composition. For example, in a case in which the slurry composition is a slurry composition for an electrode, the amount of the binder composition can be set as an amount such that the total amount of the first polymer and the second polymer, in terms of solid content, is not less than 0.5 parts by mass and not more than 15 parts by mass per 100 parts by mass of electrode active material particles. Moreover, in a case in which the slurry composition is a slurry composition for a porous membrane layer, for example, the amount of the binder composition can be set as an amount such that the total amount of the first polymer and the second polymer, in terms of solid content, is not less than 0.2 parts by mass and not more than 30 parts by mass per 100 parts by mass of non-conductive particles.

<Functional Particles>

With regards to functional particles for causing a functional layer to display an expected function, electrode active material particles may be used, for example, in a case in which the functional layer is an electrode mixed material layer, and non-conductive particles may be used, for example, in a case in which the functional layer is a porous membrane layer.

<<Electrode Active Material Particles>>

Particles formed of known electrode active materials used in secondary batteries can be used without any specific limitations as the electrode active material particles. Specifically, examples of electrode active material particles that can be used in an electrode mixed material layer of a lithium ion secondary battery, which is one example of a secondary battery, include particles formed of any of the electrode active materials described below, but are not specifically limited thereto.

[Positive Electrode Active Material]

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

[Negative Electrode Active Material]

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, oxides such as lithium titanate can be used.

One of the negative electrode active materials described above may be used individually, or two or more of the negative electrode active materials described above may be used in combination.

<<Non-Conductive Particles>>

Examples of non-conductive particles that can be compounded in a porous membrane layer include, without any specific limitations, known non-conductive particles that are used in secondary batteries.

Specifically, although both inorganic fine particles and organic fine particles (excluding those corresponding to the previously described first polymer, second polymer, and particulate binder) can be used as non-conductive particles, inorganic fine particles are normally used. The material of the non-conductive particles is preferably an electrochemically stable material that is present stably in the environment of use of a secondary battery. Examples of non-conductive particles that are preferable from the viewpoint set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of the types of non-conductive particles described above may be used individually, or two or more of the types of non-conductive particles described above may be used in combination.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

<Production of Slurry Composition>

No specific limitations are placed on the method by which the slurry composition is produced.

In a case in which the slurry composition is a slurry composition for an electrode, for example, the slurry composition can be produced by mixing the binder composition, electrode active material particles, and other components that are used as necessary, in the presence of an aqueous medium.

Moreover, in a case in which the slurry composition is a slurry composition for a porous membrane layer, for example, the slurry composition can be produced by mixing the binder composition, non-conductive particles, and other components that are used as necessary, in the presence of an aqueous medium.

Furthermore, in a case in which the slurry composition is a slurry composition for an adhesive layer, for example, the binder composition can be used as the slurry composition, the binder composition can be diluted with an aqueous medium and then used as the slurry composition, or the slurry composition can be produced by mixing the binder composition and other components that are used as necessary, in the presence of an aqueous medium.

Note that the aqueous medium used in production of the slurry composition includes that contained in the binder composition. The method of mixing is not specifically limited, and the mixing can be performed using a typically used stirrer or disperser.

(Non-Aqueous Secondary Battery Member)

The presently disclosed battery member is a member that includes a functional layer and may, more specifically, be an electrode or a separator.

The functional layer is a layer having a function such as giving and receiving electrons, reinforcement, or adhesion inside a secondary battery. For example, the functional layer may be an electrode mixed material layer that gives and receives electrons through electrochemical reactions, a porous membrane layer that improves heat resistance and strength, or an adhesive layer that improves adhesiveness.

The functional layer included in the presently disclosed battery member is a layer that is formed from the presently disclosed slurry composition set forth above, and can be formed by, for example, applying the slurry composition set forth above onto the surface of a suitable substrate to form a coating film, and subsequently drying the coating film that is formed. In other words, the functional layer included in the presently disclosed battery member is formed of a dried product of the slurry composition set forth above, normally contains at least the previously described first polymer and second polymer, and optionally further contains functional particles and other components. Note that components contained in the functional layer are components that were contained in the slurry composition, and hence the preferred ratio of these components in the functional layer is the same as the preferred ratio of the components in the slurry composition.

The presently disclosed battery member may include more than one functional layer that is formed from the presently disclosed slurry composition. For example, an electrode that is the presently disclosed battery member may include an electrode mixed material layer formed from a presently disclosed slurry composition for an electrode on a current collector and may also include a porous membrane layer and/or adhesive layer formed from a presently disclosed slurry composition for a porous membrane layer and/or slurry composition for an adhesive layer on the electrode mixed material layer. Moreover, a separator that is the presently disclosed battery member, for example, may include a porous membrane layer formed from a presently disclosed slurry composition for a porous membrane layer on a separator substrate and may also include an adhesive layer formed from a presently disclosed slurry composition for an adhesive layer on the porous membrane layer.

Furthermore, the presently disclosed battery member may include constituent elements other than a functional layer that is formed from the presently disclosed slurry composition set forth above and a substrate. Examples of such constituent elements include, but are not specifically limited to, electrode mixed material layers, porous membrane layers, and adhesive layers that do not correspond to a functional layer formed from the presently disclosed slurry composition.

As a result of the presently disclosed battery member including a functional layer that is formed from the presently disclosed slurry composition containing the presently disclosed binder composition, the battery member can both inhibit post-cycling swelling of a secondary battery and increase charge carrier acceptance of the secondary battery at low temperatures.

<<Substrate>>

No limitations are placed on the substrate onto which the slurry composition is applied. For example, a coating film of the slurry composition may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of the battery member for a secondary battery.

However, it is preferable that a current collector, a separator substrate, or an electrode substrate is used as the substrate from a viewpoint of raising battery member production efficiency since a step of peeling the functional layer can be omitted. Specifically, the slurry composition is preferably applied onto a current collector serving as a substrate when an electrode mixed material layer is to be produced. Moreover, the slurry composition is preferably applied onto a separator substrate or an electrode substrate when a porous membrane layer or an adhesive layer is to be produced.

<<Current Collector>>

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Separator Substrate>>

The separator substrate is not specifically limited and may be a known separator substrate such as an organic separator substrate. The organic separator substrate is a porous member that is made of an organic material. The organic separator substrate may, for example, be a microporous membrane or non-woven fabric containing a polyolefin resin such as polyethylene or polypropylene, an aromatic polyamide resin, or the like. In particular, a microporous membrane or non-woven fabric made from polyethylene is preferable due to having excellent strength.

<<Electrode Substrate>>

The electrode substrate (positive electrode substrate or negative electrode substrate) is not specifically limited and may be an electrode substrate including an electrode mixed material layer that contains electrode active material particles and a binder and that is formed on the current collector described above.

Known electrode active material particles and binders can be used without any specific limitations as the electrode active material particles and the binder contained in the electrode mixed material layer of the electrode substrate. Moreover, an electrode mixed material layer formed from a slurry composition that contains the presently disclosed binder composition may be used as the electrode mixed material layer of the electrode substrate.

<Production Method of Battery Member>

Examples of methods by which the functional layer may be formed on a substrate such as the current collector, separator substrate, or electrode substrate described above to produce the battery member include:

(1) a method in which the presently disclosed slurry composition is applied onto the surface of the substrate (surface at the electrode mixed material layer side in the case of an electrode substrate; same applies below) and is then dried;

(2) a method in which the substrate is immersed in the presently disclosed slurry composition and is then dried; and (3) a method in which the presently disclosed slurry composition is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the slurry composition onto a substrate (application step) and a step of drying the slurry composition that has been applied onto the substrate to form a functional layer (functional layer formation step).

<<Application Step>>

Examples of methods by which the slurry composition can be applied onto the substrate in the application step include, but are not specifically limited to, doctor blading, reverse roll coating, direct roll coating, gravure coating, extrusion coating, and brush coating.

<<Functional Layer Formation Step>>

The method by which the slurry composition on the substrate is dried in the functional layer formation step is not specifically limited and may be a commonly known method. Examples of drying methods that can be used include drying by warm, hot, or low-humidity air, drying in a vacuum, and drying by irradiation with infrared light, electron beams, or the like.

In a case in which an electrode mixed material layer is produced as the functional layer, the density of the electrode mixed material layer can be increased by pressing the electrode mixed material layer by roll pressing or the like after the drying described above. An electrode that is the presently disclosed battery member can cause a secondary battery to display excellent charge carrier acceptance at low temperatures even in a case in which the electrode mixed material layer thereof is pressed by roll pressing or the like as a result of the electrode mixed material layer being formed from a slurry composition that contains the presently disclosed binder composition.

In a case in which a negative electrode mixed material layer is produced as the functional layer, the density of the negative electrode mixed material layer can be set as 1.60 g/cm$^3$ or more, or can be set as 1.70 g/cm$^3$ or more. Although no specific limitations are placed on the upper limit of the density of the negative electrode mixed material layer, the density of the negative electrode mixed material layer can be set as 2.00 g/cm$^3$ or less, for example. By forming the negative electrode mixed material layer from a slurry composition that contains the presently disclosed binder composition, a secondary battery can be caused to display excellent charge carrier acceptance at low temperatures even in a case in which densification of the negative electrode mixed material layer is performed as described above.

The "density" of a negative electrode mixed material layer referred to in the present disclosure can be calculated using the mass of the negative electrode mixed material layer per unit area and the thickness of the negative electrode mixed material layer.

(Non-Aqueous Secondary Battery)

The presently disclosed secondary battery includes the presently disclosed battery member set forth above. More specifically, the presently disclosed secondary battery includes a positive electrode, a negative electrode, a separator, and an electrolyte solution, and at least one of the positive electrode, the negative electrode, and the separator is the battery member set forth above. The presently disclosed secondary battery has excellent charge carrier acceptance at low temperatures, and post-cycling swelling thereof is inhibited.

<Positive Electrode, Negative Electrode, and Separator>

At least one of the positive electrode, the negative electrode, and the separator used in the presently disclosed secondary battery is the presently disclosed battery member set forth above. Known positive electrodes, negative electrodes, and separators can be used without any specific limitations as a positive electrode, negative electrode, or separator that is not the presently disclosed battery member (i.e., that does not include a functional layer formed from the presently disclosed slurry composition).

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, compressing, or the like of the resultant laminate as necessary to place the laminate in a battery container, injecting the electrolyte solution into the battery container, and sealing the battery container. At least one battery member among the positive electrode, the negative electrode, and the separator is the presently disclosed battery member including a functional layer formed from the presently disclosed slurry composition. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to evaluate the weight-average molecular weight and coupling ratio of a first polymer (block copolymer); the number-average molecular weight, weight-average molecular weight, Z-average molecular weight, ratio (Mw/Mn) of weight-average molecular weight relative to number-average molecular weight, and ratio (Mz/Mw) of Z-average molecular weight relative to weight-average molecular weight of a second polymer (random copolymer); and the lithium ion acceptance at low temperatures and inhibition of post-cycling swelling of a lithium ion secondary battery.

<Weight-Average Molecular Weight and Coupling Ratio of First Polymer>

The weight-average molecular weight of a first polymer (block copolymer) was measured as a polystyrene-equivalent molecular weight by high-performance liquid chromatography (apparatus: HLC8220 (model number) produced by Tosoh Corporation). This measurement was performed using three connected columns (Shodex KF-404HQ (model number) produced by Showa Denko K.K.; column temperature: 40° C.; carrier: tetrahydrofuran at flow rate of 0.35 mL/min) and using a differential refractometer and a UV detector as detectors. Molecular weight calibration was performed by 12 points for standard polystyrene (produced by Polymer Laboratories Ltd.; standard molecular weight: 500 to 3,000,000). The weight-average molecular weight of the first polymer was identified from a chart obtained through this high-performance liquid chromatography. In addition, peaks were attributed to structures (for example, diblock structures and triblock structures), and then the coupling ratio (mass %) of the first polymer was calculated from the area ratio of these peaks.

<Number-Average Molecular Weight, Weight-Average Molecular Weight, Z-Average Molecular Weight, Mw/Mn, and Mz/Mw of Second Polymer>

A second polymer (random copolymer) was analyzed by gel permeation chromatography to determine the number-average molecular weight (Mn), weight-average molecular weight (Mw), and Z-average molecular weight thereof as standard polystyrene-equivalent values and to calculate Mw/Mn and Mz/Mw. Note that in this analysis by gel permeation chromatography, an HLC-8320GPC produced by Tosoh Corporation was used as a measurement apparatus, three connected TSKgel SuperMultiporeHZ columns produced by Tosoh Corporation were used as a column, tetrahydrofuran was used as a solvent, and measurement was performed at 40° C. and a flow rate of 1.0 mL/min.

<Lithium Ion Acceptance at Low Temperatures>

A produced lithium ion secondary battery was left at rest in a 25° C. environment for 24 hours, was subsequently subjected to a charging operation for 1 hour with a constant current at 1.0 C in a 25° C. environment, and the normal temperature charge capacity (C0) of the lithium ion secondary battery was measured. Thereafter, the lithium ion secondary battery was discharged with a 0.1 C constant current in a 25° C. environment, and this discharging was stopped when 3 V was reached. Next, the lithium ion secondary battery was subjected to 1 hour of charging with a constant current at 1.0 C in a −10° C. environment, and the low-temperature charge capacity (C1) thereof was measured. A ratio (C1/C0) of C1 relative to C0 was calculated and was evaluated by the following standard. A larger value for C1/C0 indicates that the secondary battery has better lithium ion acceptance at low temperatures.

A: C1/C0 of not less than 0.65 and not more than 1
B: C1/C0 of not less than 0.5 and less than 0.65
C: C1/C0 of less than 0.5

<Inhibition of Post-Cycling Swelling>

A produced lithium ion secondary battery was left at rest in a 25° C. environment for 5 hours and then the thickness (d0) of the battery was measured. Next, the lithium ion secondary battery was subjected to 250 cycles of an operation of constant current-constant voltage charging (CC-CV charging) to 4.2 V at 1 C (cut-off condition: 0.05 C) and constant current discharging (CC discharging) to 3 V at 1 C in a 25° C. environment.

At the end of 250 cycles, the lithium ion secondary battery was CC-CV charged to 4.2 V at 1 C (cut-off condition: 0.05 C) in a 25° C. environment, and the thickness (d1) of the battery in a charged state was measured. The rate of thickness increase after cycling $(=\{(d1-d0)/d0\} \times 100(\%))$ was calculated and was evaluated by the following standard. A smaller value for the rate of thickness increase after cycling indicates that post-cycling swelling of the secondary battery is inhibited.

A: Rate of thickness increase after cycling of less than 8%
B: Rate of thickness increase after cycling of not less than 8% and less than 12%
C: Rate of thickness increase after cycling of 12% or more Example 1

<Production of First Polymer>

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of the reaction liquid (containing 30.0 parts of polymer component) and was mixed therewith to obtain a solution (polymer solution S1) of a first polymer (block copolymer). The obtained block copolymer had a proportional content of styrene units of 25%, a proportional content of isoprene units of 75%, a coupling ratio of 82%, and a weight-average molecular weight of 140,000.

<Production of Second Polymer>

A mixture of 56.1 parts of cyclopentane and 24.6 parts of cyclopentene (alicyclic monoolefin monomer having carbon number of not less than 4 and not more than 6) was charged to a polymerization reactor, was heated to 60° C., and then 0.6 parts of aluminum chloride was added thereto (mixture M1). Next, polymerization was carried out while the temperature (60° C.) was maintained and while a mixture a1 containing 41.4 parts of 1,3-pentadiene, 8.4 parts of isobutylene (acyclic monoolefin monomer having carbon number of not less than 4 and not more than 8), 22.0 parts of styrene (aromatic monoolefin monomer), 0.5 parts of C4-C6 unsaturated hydrocarbons (excluding 1,3-pentadiene; same applies below), and 7.2 parts of C4-C6 saturated hydrocarbons and 0.2 parts of t-butyl chloride were continuously added into the polymerization reactor containing the mixture M1 over 60 minutes via separate lines. Thereafter, sodium hydroxide aqueous solution was added to the polymerization reactor to terminate the polymerization reaction. Sediment produced through termination of polymerization was removed by filtration, and then the resultant polymer solution was charged to a distillation still and was heated under a nitrogen atmosphere to remove polymerization solvent and unreacted monomer. In addition, a low molecular weight oligomer component was evaporated while blowing in saturated steam at 240° C. or higher.

After evaporation of the low molecular weight oligomer component, 3.1 parts of maleic anhydride (carboxyl group-containing monomer) was added to 100 parts of the molten polymer, and an addition reaction was carried out at 230° C. for 1 hour. After this addition reaction, 0.2 parts of pentaerythritol tetrakis[3-(3,5-di-t-butyl-4-hydroxyphenyl)propionate] (produced by BASF; product name: Irganox 1010) was added and mixed as an antioxidant. Thereafter, the molten resin was removed from the distillation still and was left to cool to room temperature to obtain a molten resin containing a second polymer.

Note that the proportion of 1,3-pentadiene units in the obtained second polymer was 41%. Moreover, the second polymer was a random copolymer having a number-average molecular weight of 1,400, a weight-average molecular weight of 2,400, a Z-average molecular weight of 5,400, Mw/Mn of 1.7, Mz/Mw of 2.3, a softening point of 95° C., and an acid value of 10 KOH-mg/g.

A polymer solution S2 was obtained by dissolving 30 kg of the obtained molten resin containing the second polymer in 70 kg of cyclohexane.

<Production of Binder Composition for Secondary Battery Negative Electrode>

Sodium linear alkylbenzene sulfonate was dissolved in deionized water to produce an aqueous solution having a total solid content of 2%. A tank was charged with 500 g of this aqueous solution, 475 g of the polymer solution S1, and 25 g of the polymer solution S2, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause phase-inversion emulsification of the preliminary mixture and obtain an emulsion.

Cyclohexane in the obtained emulsion was subsequently vacuum evaporated in a rotary evaporator. Thereafter, the emulsion that had been subjected to evaporation was left to separate for 1 day in a chromatographic column equipped with a stop-cock, and the lower layer portion after separation was removed to perform concentration.

Finally, the upper layer portion was filtered through a 100-mesh screen to obtain a latex containing the first polymer and the second polymer (binder composition for secondary battery negative electrode; solid content concentration: 40%; proportion constituted by content of second polymer among total content of first polymer and second polymer: 5.0%).

<Production of Slurry Composition for Secondary Battery Negative Electrode>

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active material particles, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The obtained mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.2 parts in terms of solid content of the binder composition for a secondary battery negative electrode produced as described above were added to the obtained mixed liquid, and the final solid content concentration was adjusted to 48%. Further mixing was performed for 10 minutes, and then a defoaming process was carried out under reduced pressure to yield a slurry composition for a secondary battery negative electrode having good fluidity.

<Production of Negative Electrode>

The obtained slurry composition for a secondary battery negative electrode was applied onto copper foil (current collector) of 20 μm in thickness by a comma coater such as to have a coating weight after drying of 14 mg/cm². The applied slurry composition was dried by conveying the copper foil inside a 60° C. oven for 2 minutes at a speed of 0.5 m/min. Thereafter, 2 minutes of heat treatment was performed at 120° C. to obtain a negative electrode web. The negative electrode web was rolled by roll pressing to obtain a negative electrode having a negative electrode mixed material layer thickness of 80 μm.

<Production of Positive Electrode>

A slurry composition for a secondary battery positive electrode was obtained by combining 100 parts of $LiCoO_2$ having a volume-average particle diameter of 12 μm as positive electrode active material particles, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a secondary battery positive electrode was applied onto aluminum foil (current collector) of 20 μm in thickness by a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode including a positive electrode mixed material layer.

<Preparation of Separator>

A separator made from a single layer of polypropylene (produced by Celgard, LLC.; product name: Celgard 2500) was used as a separator.

<Production of Lithium Ion Secondary Battery>

The obtained positive electrode was cut out as a rectangle of 49 cm×5 cm and was placed with the surface at the positive electrode mixed material layer side facing upward. The separator was cut out as 120 cm×5.5 cm and was arranged on the positive electrode mixed material layer such that the positive electrode was positioned at a longitudinal direction left-hand side of the separator. In addition, the obtained negative electrode was cut out as a rectangle of 50 cm×5.2 cm and was arranged on the separator such that the surface at the negative electrode mixed material layer side of the negative electrode faced the separator and such that the negative electrode was positioned at a longitudinal direction right-hand side of the separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to thereby produce a wound lithium ion secondary battery having a capacity of 800 mAh. The obtained lithium ion secondary battery was used to evaluate lithium ion acceptance at low temperatures and inhibition of post-cycling swelling. The results are shown in Table 1.

Example 2

A first polymer, a second polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that the additive amount of styrene was changed to 15.0 kg and the additive amount of isoprene was changed to 85.0 kg in production of the first polymer. Evaluations were conducted in the same manner as in Example 1. The results are shown in Table 1.

Note that the obtained block copolymer (first polymer) had a proportional content of styrene units of 15%, a proportional content of isoprene units of 85%, a coupling ratio of 84%, and a weight-average molecular weight of 142,000.

Example 3

A first polymer, a second polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that the additive amount of styrene was changed to 32.0 kg and the additive amount of isoprene was changed to 68.0 kg in production of the first polymer. Evaluations were conducted in the same manner as in Example 1. The results are shown in Table 1.

Note that the obtained block copolymer (first polymer) had a proportional content of styrene units of 32%, a proportional content of isoprene units of 68%, a coupling ratio of 79%, and a weight-average molecular weight of 136,000.

Example 4

A first polymer, a second polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that the additive amount of 1,3-pentadiene was changed to 65.0 parts, the additive amount of cyclopentene was changed to 14.4 parts, the additive amount of isobutylene was changed to 4.3 parts, the additive amount of styrene was changed to 12.9 parts, and the additive amount of C4-C6 unsaturated hydrocarbons was changed to 0.3 parts in production of the second polymer. Evaluations were conducted in the same manner as in Example 1. The results are shown in Table 1.

Note that the proportion of 1,3-pentadiene units in the obtained second polymer was 65%. Moreover, the second polymer was a random copolymer having a number-average molecular weight of 2,100, a weight-average molecular weight of 3,600, a Z-average molecular weight of 7,200, Mw/Mn of 1.7, Mz/Mw of 2.0, a softening point of 131° C., and an acid value of 10 KOH-mg/g.

Examples 5 and 6

A first polymer, a second polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that the charged amounts of the polymer solution S1 and the polymer solution S2 in production of the binder composition for a secondary battery negative electrode were changed such that the proportion constituted by the content of the second polymer among the total content of the first polymer and the second polymer was changed to 9.0% (Example 5) or 0.3%

(Example 6). Evaluations were conducted in the same manner as in Example 1. The results are shown in Table 1.

Example 7

<Production of First Polymer and Second Polymer>

A first polymer and a second polymer were produced in the same way as in Example 1.

<Production of Binder Composition for Secondary Battery Porous Membrane Layer>

A latex containing the first polymer and the second polymer was produced in the same way as the "binder composition for a secondary battery negative electrode" in Example 1, and this latex was used as a binder composition for a secondary battery porous membrane layer.

<Production of Slurry Composition for Secondary Battery Porous Membrane Layer>

A slurry composition for a secondary battery porous membrane layer was produced by using a ball mill to mix 100 parts in terms of solid content of a water dispersion of alumina (produced by Sumitomo Chemical Co., Ltd.; product name: AKP3000) as non-conductive particles, 0.5 parts in terms of solid content of carboxymethyl cellulose (1380 produced by Daicel FineChem Ltd.), and 10 parts in terms of solid content of the binder composition for a secondary battery porous membrane layer obtained as described above.

<Production of Porous Membrane Layer-Equipped Separator>

The slurry composition for a secondary battery porous membrane layer obtained as described above was applied onto one side of a separator made from a single layer of polypropylene (produced by Celgard, LLC.; product name: Celgard 2500) serving as a separator substrate and was dried at 50° C. for 3 minutes. Thereafter, the slurry composition for a secondary battery porous membrane layer obtained as described above was applied onto the other side of the separator and was dried at 50° C. for 3 minutes to obtain a porous membrane layer-equipped separator including porous membrane layers (each 1 μm in thickness) at both sides.

<Production of Negative Electrode>

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active material particles, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The obtained mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.2 parts in terms of solid content of a binder composition for a secondary battery negative electrode produced in the same way as in Comparative Example 3 described further below were added to the obtained mixed liquid, and the final solid content concentration was adjusted to 48%. Further mixing was performed for 10 minutes, and then a defoaming process was carried out under reduced pressure to yield a slurry composition for a secondary battery negative electrode having good fluidity.

<Production of Positive Electrode>

A positive electrode was produced in the same way as in Example 1.

<Production of Lithium Ion Secondary Battery>

The obtained positive electrode was cut out as a rectangle of 49 cm×5 cm and was placed with the surface at the positive electrode mixed material layer side facing upward. The porous membrane layer-equipped separator was cut out as 120 cm×5.5 cm and was arranged on the positive electrode mixed material layer such that the positive electrode was positioned at a longitudinal direction left-hand side of the separator. In addition, the obtained negative electrode was cut out as a rectangle of 50 cm×5.2 cm and was arranged on the separator such that the surface at the negative electrode mixed material layer side of the negative electrode faced the porous membrane layer-equipped separator and such that the negative electrode was positioned at a longitudinal direction right-hand side of the porous membrane layer-equipped separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to thereby produce a wound lithium ion secondary battery having a capacity of 800 mAh. The obtained lithium ion secondary battery was used to evaluate lithium ion acceptance at low temperatures and inhibition of post-cycling swelling. The results are shown in Table 1.

Example 8

A latex containing a first polymer and a second polymer was produced in the same way as the "binder composition for a secondary battery negative electrode" in Example 4, and this latex was used as a binder composition for a secondary battery porous membrane layer. A slurry composition for a secondary battery porous membrane layer, a negative electrode, a positive electrode, a porous membrane layer-equipped separator, and a lithium ion secondary battery were then produced in the same way as in Example 7 with the exception that this binder composition for a secondary battery porous membrane layer was used in production of the slurry composition for a secondary battery porous membrane layer. Evaluations were conducted in the same manner as in Example 1. The results are shown in Table 1.

Comparative Example 1

A first polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that a second polymer was not produced, and, in production of the binder composition for a secondary battery negative electrode, a polymer solution S2 containing a second polymer was not used and the used amount of the polymer solution S1 containing the first polymer was changed to 500 g. Evaluations were conducted in the same manner as in Example 1. The results are shown in Table 1.

Comparative Example 2

A second polymer, a binder composition for a secondary battery negative electrode, and a slurry composition for a secondary battery negative electrode were produced, and production of a negative electrode was attempted in the same way as in Example 1 with the exception that a first polymer was not produced, and, in production of the binder composition for a secondary battery negative electrode, a polymer solution S1 containing a first polymer was not used and the used amount of the polymer solution S2 containing the second polymer was changed to 500 g. However, the negative electrode mixed material layer could not be well adhered to the current collector without the first polymer, and it was not possible to produce a negative electrode that could be used in production of a secondary battery.

Comparative Example 3

A second polymer, a binder composition for a secondary battery negative electrode, a slurry composition for a secondary battery negative electrode, a negative electrode, a positive electrode, a separator, and a lithium ion secondary battery were prepared or produced in the same way as in Example 1 with the exception that a styrene-butadiene random copolymer (and a polymer solution containing the copolymer) produced as described below were used instead of the first polymer (and the polymer solution S1) in production of the binder composition for a secondary battery negative electrode. Evaluations were conducted in the same manner as in Example 1. The results are shown in Table 1.
<Production of Styrene-Butadiene Random Copolymer>

A reactor was charged with 150 parts of deionized water, 25 parts of sodium dodecylbenzenesulfonate aqueous solution (concentration: 10%) as an emulsifier, 36 parts of styrene as an aromatic vinyl monomer, 3 parts of itaconic acid as a carboxyl group-containing monomer, 1 part of 2-hydroxyethyl acrylate as a hydroxy group-containing monomer, and 0.5 parts of t-dodecyl mercaptan as a molecular weight modifier in this order. Next, gas inside the reactor was purged with nitrogen three times, and then 61 parts of 1,3-butadiene was added into the reactor as an aliphatic conjugated diene monomer. The reactor was held at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction. Thereafter, residual monomer was removed using a rotary evaporator having a water temperature of 60° C. to obtain a water dispersion of a particulate polymer (polymer solution containing a styrene-butadiene random copolymer).

Comparative Example 4

A latex containing a first polymer was produced in the same way as the "binder composition for a secondary battery negative electrode" in Comparative Example 1, and this latex was used as a binder composition for a secondary battery porous membrane layer. A slurry composition for a secondary battery porous membrane layer, a negative electrode, a positive electrode, a porous membrane layer-equipped separator, and a lithium ion secondary battery were then produced in the same way as in Example 7 with the exception that this binder composition for a secondary battery porous membrane layer was used in production of the slurry composition for a secondary battery porous membrane layer. Evaluations were conducted in the same manner as in Example 1. The results are shown in Table 1.

Comparative Example 5

A latex containing a second polymer was produced in the same way as the "binder composition for a secondary battery negative electrode" in Comparative Example 2, and this latex was used as a binder composition for a secondary battery porous membrane layer. A slurry composition for a secondary battery porous membrane layer, a negative electrode, a positive electrode, a porous membrane layer-equipped separator, and a lithium ion secondary battery were then produced in the same way as in Example 7 with the exception that this binder composition for a secondary battery porous membrane layer was used in production of the slurry composition for a secondary battery porous membrane layer. Evaluations were conducted in the same manner as in Example 1. The results are shown in Table 1.

In Table 1, shown below:
"ST" indicates styrene unit;
"IP" indicates isoprene unit;
"BD" indicates 1,3-butadiene unit;
"Gr" indicates graphite;
"$Al_2O_3$" indicates alumina (aluminum oxide); and
"Second polymer/(First polymer+Second polymer)" indicates proportion constituted by content of second polymer among total content of first polymer and second polymer.

TABLE 1

| Slurry composition | Binder composition | First polymer | | Structure | | Example 1 | Example 2 | Example 3 | Example 4 | Example 5 | Example 6 | Example 7 |
|---|---|---|---|---|---|---|---|---|---|---|---|---|
| | | | | Battery member including functional layer | | Negative electrode | Negative electrode | Negative electrode | Negative electrode | Negative electrode | Negative electrode | Separator |
| | | | Aromatic vinyl monomer unit | Type | Block | Block | Block | Block | Block | Block | Block |
| | | | | | ST | ST | ST | ST | ST | ST | ST |
| | | | | Proportional content [mass %] | 25 | 15 | 32 | 25 | 25 | 25 | 25 |
| | | | Aliphatic conjugated diene monomer unit | Type | IP | IP | IP | IP | IP | IP | IP |
| | | | | Proportional content [mass %] | 75 | 85 | 68 | 75 | 75 | 75 | 75 |
| | | Second polymer | | Structure | | Random | Random | Random | Random | Random | Random | Random |
| | | | 1,3-Pentadiene unit | Proportional content [mass %] | 41 | 41 | 41 | 65 | 41 | 41 | 41 |

TABLE 1-continued

| | | | | | | | | | | | |
|---|---|---|---|---|---|---|---|---|---|---|---|
| | | Softening point [° C.] | | | 95 | 95 | 95 | 131 | 95 | 95 | 95 |
| | | Acid value [KOH-mg/g] | | | 10 | 10 | 10 | 10 | 10 | 10 | 10 |
| | | Second polymer/(First polymer + Second polymer [mass %] | | | 5 | 5 | 5 | 5 | 9 | 0.3 | 5 |
| | | Electrode active material particles | | | Gr | Gr | Gr | Gr | Gr | Gr | — |
| | | Non-conductive particles | | | — | — | — | — | — | — | $Al_2O_3$ |
| | | Lithium acceptance at low temperatures | | | A | A | A | A | B | A | A |
| | | Inhibition of post-cycling swelling | | | A | A | A | B | A | B | A |

| | | | | | Example 8 | Comparative Example 1 | Comparative Example 2 | Comparative Example 3 | Comparative Example 4 | Comparative Example 5 |
|---|---|---|---|---|---|---|---|---|---|---|
| | Battery member including functional layer | | | | Separator | Negative electrode | Negative electrode | Negative electrode | Separator | Separator |
| Slurry composition | Binder composition | First polymer | Structure | | Block | Block | — | Random | Block | — |
| | | | Aromatic vinyl monomer unit | Type | ST | ST | — | ST | ST | — |
| | | | | Proportional content [mass %] | 25 | 25 | — | 36.3 | 25 | — |
| | | | Aliphatic conjugated diene monomer unit | Type | IP | IP | — | BD | IP | — |
| | | | | Proportional content [mass %] | 75 | 75 | — | 59.8 | 75 | — |
| | | Second polymer | Structure | | Random | — | Random | Random | — | Random |
| | | | 1,3-Pentadiene unit | Proportional content [mass %] | 65 | — | 41 | 41 | — | 41 |
| | | Softening point [° C.] | | | 131 | — | 95 | 95 | — | 95 |
| | | Acid value [KOH-mg/g] | | | 10 | — | 10 | 10 | — | 10 |
| | | Second polymer/(First polymer + Second polymer [mass %] | | | 5 | 0 | 100 | 5 | 0 | 100 |
| | | Electrode active material particles | | | — | Gr | — | Gr | — | — |
| | | Non-conductive particles | | | $Al_2O_3$ | — | — | — | $Al_2O_3$ | $Al_2O_3$ |
| | | Lithium acceptance at low temperatures | | | A | C | — | B | C | B |
| | | Inhibition of post-cycling swelling | | | B | B | — | C | B | C |

It can be seen from Table 1 that is was possible to inhibit post-cycling swelling of a secondary battery while also ensuring lithium ion (charge carrier) acceptance of the secondary battery at low temperatures in Examples 1 to 8 in which a functional layer (negative electrode mixed material layer or porous membrane layer) was formed using a binder composition that contained a specific first polymer and a specific second polymer.

On the other hand, lithium ion acceptance of a secondary battery at low temperatures decreased in Comparative Example 1 in which a negative electrode mixed material layer was formed as a functional layer using a binder composition that contained a specific first polymer but did not contain a specific second polymer.

Moreover, a negative electrode could not be produced as previously described in Comparative Example 2 in which formation of a negative electrode mixed material layer as a functional layer was attempted using a binder composition that contained a specific second polymer but did not contain a specific first polymer.

Furthermore, post-cycling swelling of a secondary battery could not be inhibited in Comparative Example 3 in which a negative electrode mixed material layer was formed as a functional layer using a binder composition that contained a styrene-butadiene random copolymer instead of a specific first polymer.

Also, lithium ion acceptance of a secondary battery at low temperatures decreased in Comparative Example 4 in which a porous membrane layer was formed as a functional layer using a binder composition that contained a specific first polymer but did not contain a specific second polymer.

Moreover, post-cycling swelling of a secondary battery could not be inhibited in Comparative Example 5 in which a porous membrane layer was formed as a functional layer using a binder composition that contained a specific second polymer but did not contain a specific first polymer.

INDUSTRIAL APPLICABILITY

According to the present disclosure, it is possible to provide a binder composition for a non-aqueous secondary battery functional layer and a slurry composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Moreover, according to the present disclosure, it is possible to provide a non-aqueous secondary battery member including a functional layer that can both inhibit post-cycling swelling of a non-aqueous secondary battery and increase charge carrier acceptance of the non-aqueous secondary battery at low temperatures.

Furthermore, according to the present disclosure, it is possible to provide a non-aqueous secondary battery in which post-cycling swelling is inhibited and that has excellent charge carrier acceptance at low temperatures.

The invention claimed is:
1. A binder composition for a non-aqueous secondary battery functional layer, comprising a first polymer, a second polymer, and a solvent, wherein
the first polymer is a block copolymer including a block region formed of an aromatic vinyl monomer unit and a block region formed of either or both of an aliphatic conjugated diene monomer unit and a hydrogenated aliphatic conjugated diene monomer unit, the second polymer is a random copolymer including either or both of a 1,3-pentadiene unit and a hydrogenated 1,3-pentadiene unit, the second polymer further includes an alicyclic monoolefin monomer unit having a carbon number of not less than 4 and not more than 6, and a proportion constituted by the alicyclic monoolefin monomer unit having the carbon number of not less than 4 and not more than 6 in the second polymer is 10 mass % or more and 35 mass % or less, and content of the second polymer is not less than 0.1 mass % and 8.0 mass % or less of total content of the first polymer and the second polymer, and wherein the second polymer further includes an acyclic monoolefin monomer unit having a carbon number of not less than 4 and not more than 8, and a proportion constituted by the acyclic monoolefin monomer unit having the carbon number of not less than 4 and not more than 8 in the second polymer is 5 mass % or more and 30 mass % or less.

2. The binder composition for a non-aqueous secondary battery functional layer according to claim 1, wherein proportional content of the aromatic vinyl monomer unit in the first polymer is not less than 10 mass % and not more than 50 mass %.

3. The binder composition for a non-aqueous secondary battery functional layer according to claim 1, wherein a total of proportional content of the 1,3-pentadiene unit and proportional content of the hydrogenated 1,3-pentadiene unit in the second polymer is not less than 20 mass % and not more than 70 mass %.

4. The binder composition for a non-aqueous secondary battery functional layer according to claim 1, wherein the second polymer has a softening point of not lower than 70° C. and not higher than 170° C.

5. The binder composition for a non-aqueous secondary battery functional layer according to claim 1, wherein the second polymer has an acid value of not less than 1 KOH-mg/g and not more than 20 KOH-mg/g.

6. The binder composition for a non-aqueous secondary battery functional layer according to claim 1, wherein the aliphatic conjugated diene monomer unit is an isoprene unit, and the hydrogenated aliphatic conjugated diene monomer unit is a hydrogenated isoprene unit.

7. The binder composition for a non-aqueous secondary battery functional layer according to claim 1, wherein a coupling ratio of the first polymer is 60 mass % or more and 92 mass % or less, and the coupling ratio is a mass proportion constituted by coupling moiety-containing structures among all structures of the first polymer.

8. A slurry composition for a non-aqueous secondary battery functional layer comprising the binder composition for a non-aqueous secondary battery functional layer according to claim 1.

9. The slurry composition for a non-aqueous secondary battery functional layer according to claim 8, further comprising electrode active material particles.

10. The slurry composition for a non-aqueous secondary battery functional layer according to claim 8, further comprising non-conductive particles.

11. A non-aqueous secondary battery member comprising a functional layer for a non-aqueous secondary battery formed using the slurry composition for a non-aqueous secondary battery functional layer according to claim 8.

12. A non-aqueous secondary battery comprising the non-aqueous secondary battery member according to claim 11.

* * * * *